United States Patent

Sunakawa et al.

[11] Patent Number: 5,828,782
[45] Date of Patent: Oct. 27, 1998

[54] IMAGE PROCESSING APPARATUS AND METHOD

[75] Inventors: Shinichi Sunakawa, Asaka; Kazuhiro Matsubayashi, Yokohama, both of Japan

[73] Assignee: Canon Kabushiki Kaisha, Tokyo, Japan

[21] Appl. No.: 681,958

[22] Filed: Jul. 30, 1996

[30] Foreign Application Priority Data

Aug. 1, 1995 [JP] Japan .................................... 7-196390

[51] Int. Cl.⁶ ....................................................... G06K 9/34
[52] U.S. Cl. ......................... 382/173; 382/176; 382/280; 382/281
[58] Field of Search .................................... 382/173, 176, 382/180, 248, 250, 280, 281; 358/462, 464, 467

[56] References Cited

U.S. PATENT DOCUMENTS 5,101,438   3/1992   Kanda et al. ............................ 382/176

FOREIGN PATENT DOCUMENTS 2202771   8/1990   Japan .

OTHER PUBLICATIONS

"DCT Method Using Adaptive Quantization", The Journal of the Institute of Image Electronics Engineers of Japan, vol. 20, No.5 1991 and English Abstract.

Mizuno et al., "Image Region Separation Method Using DCT Conversion", Proceedings of the Institute of Image Electronics Engineering of Japan, (IIEEJ), Jan. 2, 1993, and English Translation.

*Primary Examiner*—Phuoc Tran
*Attorney, Agent, or Firm*—Fitzpatrick,Cella, Harper & Scinto

[57] ABSTRACT

An image processing apparatus which eliminates influence of motion of background and performs stable text-image cutout at a high extraction rate. In the apparatus, a block divider 20 divides image data in frame units into blocks of a predetermined size. A DCT unit 24 performs orthogonal transformation on each divided block, and a harmonic coefficient calculator 25 extracts data for judging whether or not the block is a character area. A still-block detector 26 compares the data with data of a corresponding block after orthogonal transformation in a previous frame, judges whether or not the difference between these data is small or large, and outputs the result of judgment. An attribute judgment unit 23 judges whether or not the block is a character area, based on the data from the harmonic coefficient calculator 25 and the data from the still-block detector 26, and outputs the result of judgment.

22 Claims, 9 Drawing Sheets

FIG. 7
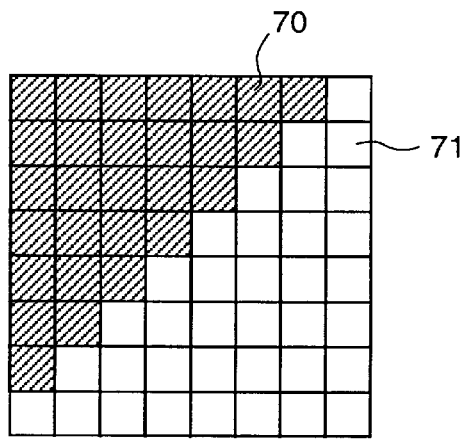
FIG. 8
| AREA ATTRIBUTE | LOW-FREQUENCY RATIO | HIGH-FREQUENCY RATIO |
|---|---|---|
| CHARACTER | 50 | 50 |
| HALFTONE | 95 | 5 |
| CHARACTER + HALFTONE | 70 | 30 |
FIG. 9
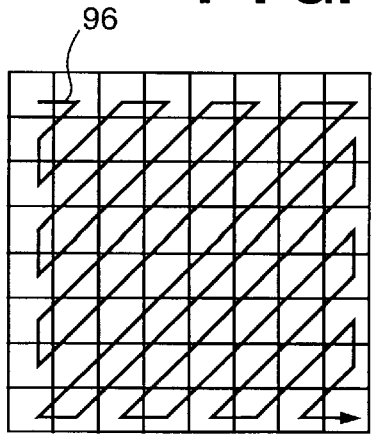

IMAGE PROCESSING APPARATUS AND METHOD

BACKGROUND OF THE INVENTION

This invention relates to an image processing apparatus and method for converting image data into data on axes in frequency space and discriminating the type of image areas of the image data.

Conventionally, in copying machines and OCR devices, a method for converting images into data on axes in frequency space and separating the data into picture image areas, screened-dot image areas and character areas is known.

The Journal of the Institute of Image Electronics Engineers of Japan (IIEEJ) on Jan. 2, 1993 discloses an image-area division method based on the difference between frequency characteristics of character images and screened-dot image areas. This method first divides image data into small 8×8 pixel blocks and performs DCT (Discrete Cosine Transformation) on the divided blocks. The DCT is widely used for image coding in accordance with JPEG standards and the like, for converting image data into data on a frequency axis. As a result, the cell in the first row and in the first column includes a direct current component with respect to the whole block, and the other cells have coefficients indicating horizontal frequencies in the row direction and vertical frequencies in the column direction. In each direction, as a column (or row) number increases, it indicates a higher frequency. Following the above DCT conversion, zigzag scanning is performed to convert the two-dimensional block data into one-dimensional data. This is also used in the JPEG standards to perform scanning orthogonally from a low-frequency portion to a high-frequency portion as shown in FIG. 9. The next step is calculation of a "zigzag rate" in accordance with the following equation:

$$\text{ZigZag\_Rate}[i] = \text{ZigZag}[i] \times 2 - \text{ZigZag}[i-1] - \text{ZigZag}[i+1] \quad (i=1 \sim 63) \tag{1}$$

Then integration is performed on the low-frequency portion and the high-frequency portion of the zigzag rate, as ZZ_Rate_moji, ZZ_Rate_HT.

That is, ZZ_Rate_moji is a value where ZigZag_Rate[i] having a small absolute value i is added, while ZZ_Rate_HT is a value where ZigZag_Rate[i] having a large absolute value i is added.

When a judgment condition as the following equation (2) holds, it is judged that the input block image is a character image, while if the following equation (3) can hold, it is judged that the input block image is a screened dot image. This judgment can be made by utilizing the point that a character image has large low-frequency component values, while a screened dot image has large high-frequency component values.

$$ZZ\_Rate\_moji + key \geq C_1 \tag{2}$$

$$ZZ\_Rate\_HT + key \leq C_2 \tag{3}$$

The constants $C_1$ and $C_2$ are experimentally set values, and "key" is obtained from calculating the judgment results of peripheral four blocks (i.e., an upper block, a diagonally upper right block, left block, and a block next to the left block (two-blocks left block)) with respect to a block of interest, in accordance with the following equation (4):

$$key = 0.25(flag(upper) + flag(left)) + 0.125(flag(two\text{-}blocks\ left) + flag(diagonally\ upper\ right)) \tag{4}$$

Note that "flag" has a negative value when the judgment result is "a character area", while it has a positive value when the judgment result is "a screened dot image area".

Next, the processing "DCT Method Using Adaptive Quantization" proposed in The Journal of the Institute of Image Electronics Engineers of Japan vol. 20, No. 5 (1991) will be described. The purpose of this method is to prevent degradation of character images and to improve the compression rate of screened dot images by separating character images from screened dot images and switching over quantization tables for image compression. Also, this method first divides image data into 8×8 pixel blocks and then performs DCT; next, calculates, in FIGS. 10A to 10E, for example, sums of the absolute values of coefficients included in areas 90 to 94 respectively. If the value in the sums of coefficients of the areas 91 to 94 is greater than the value of the area 90 and greater than a predetermined threshold value A, it is determined that the block is a screened dot image. In FIG. 10F, if a sum of the absolute values of coefficients included in an area 95 is greater than a threshold value B and it is not determined that the block is a screened dot image, it is determined that the block is a character image.

Next, the processing proposed in "Facsimile Apparatus" in Japanese Patent Application Laid-Open No. 2-202771 will be described. The purpose of this apparatus is to clarify separation of binary image areas from halftone image areas. In this apparatus, a image-area separation parameter determination unit divides image data into 4×4 pixel blocks and performs two-dimensional Hadamard transformation on the divided blocks, with an image-area separation parameter L obtained by:

$$L = \Sigma\Sigma Yij^2 (i+j=3,4,5,6) \tag{5}$$

Yij: a coefficient for the Hadamard transformation

Then, a slice level of binarization is determined in accordance with the value of L. This is based on "the result of conversion on the premise of binary image area has greater energy with respect to a high-frequency area in space frequencies". That is, in a binary image area, L has a large value, while in a halftone image area, L has a small value.

However, if the above techniques are applied to a moving image, processing must be independently performed on each frame constituting the moving image. In a moving image, an image area which is similar to a character area may appear depending on the motion of an object in each frame. This causes a problem that even in adjacent frames, an extracted area greatly differs. In such case, stable extraction cannot be made.

SUMMARY OF THE INVENTION

The present invention has been made in consideration of the above situation, and has its object to provide an image processing apparatus and method which eliminates influence of the motion of a background and performs image cutout with high extraction rate in a stable manner.

According to the present invention, the foregoing object is attained by providing an image processing apparatus which sequentially inputs frame images, transforms input image data into data on axes in frequency space, and judges the type of image areas based on features of the data on the axes in space frequency, comprising: transformation means for orthogonally transforming input frame image data by blocks of a predetermined size; first judgment means for judging an attribute of a block of interest in a current frame, based on the result of orthogonal transformation by the transformation means; second judgment means for judging the attribute of the block of interest in the current frame, based on the result of orthogonal transformation on at least one previous frame inputted prior to the current frame; and discrimination means for discriminating the attribute of the block of interest in the current frame, based on the results of judgment by the first and second judgment means.

Preferably, the transformation means performs discrete cosine transformation, Hadamard transformation or Fourier transformation. As a result of the transformation, the transformation result of each block can be converted into data in frequency bands.

Preferably, the first judgment means includes: calculation means for calculating a sum of coefficients within a block after orthogonal transformation; and comparison means for comparing the sum with a predetermined threshold value.

Preferably, the second judgment means includes: second calculation means for calculating at least a sum of differences between respective coefficients within the block of interest, after orthogonal transformation, in the current frame, and respective coefficients within a block, corresponding to the block of interest, after orthogonal transformation, in the previous frame; and comparison means for comparing the calculated sum with a predetermined threshold value.

Preferably, the image processing apparatus further comprises extraction means for extracting a feature amount in a predetermined band, based on data obtained after the orthogonal transformation by the transformation means on the block of interest, wherein the discrimination means discriminates the attribute of the block of interest, based on the result of extraction by the extraction means in addition to the results of judgment by the first and second judgment means.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is an explanatory view showing areas separated by a band separator;

FIG. 8 is an attribute judgment table of band area separation;

FIG. 9 is an explanatory view showing the order of zigzag scanning in the conventional art;

DETAILED DESCRIPTION OF THE PREFERRED EMBODIMENTS

Preferred embodiments of the present invention will now be described in detail in accordance with the accompanying drawings.

<Construction of Apparatus (FIG. 2)>

An image processing apparatus according to a first embodiment of the present invention is a personal computer or the like having a means for inputting images from external interface and storing the input images. The apparatus has functions to cutout character areas from the input images and construct a database and to utilize the database for image retrieval.

Figure 2:
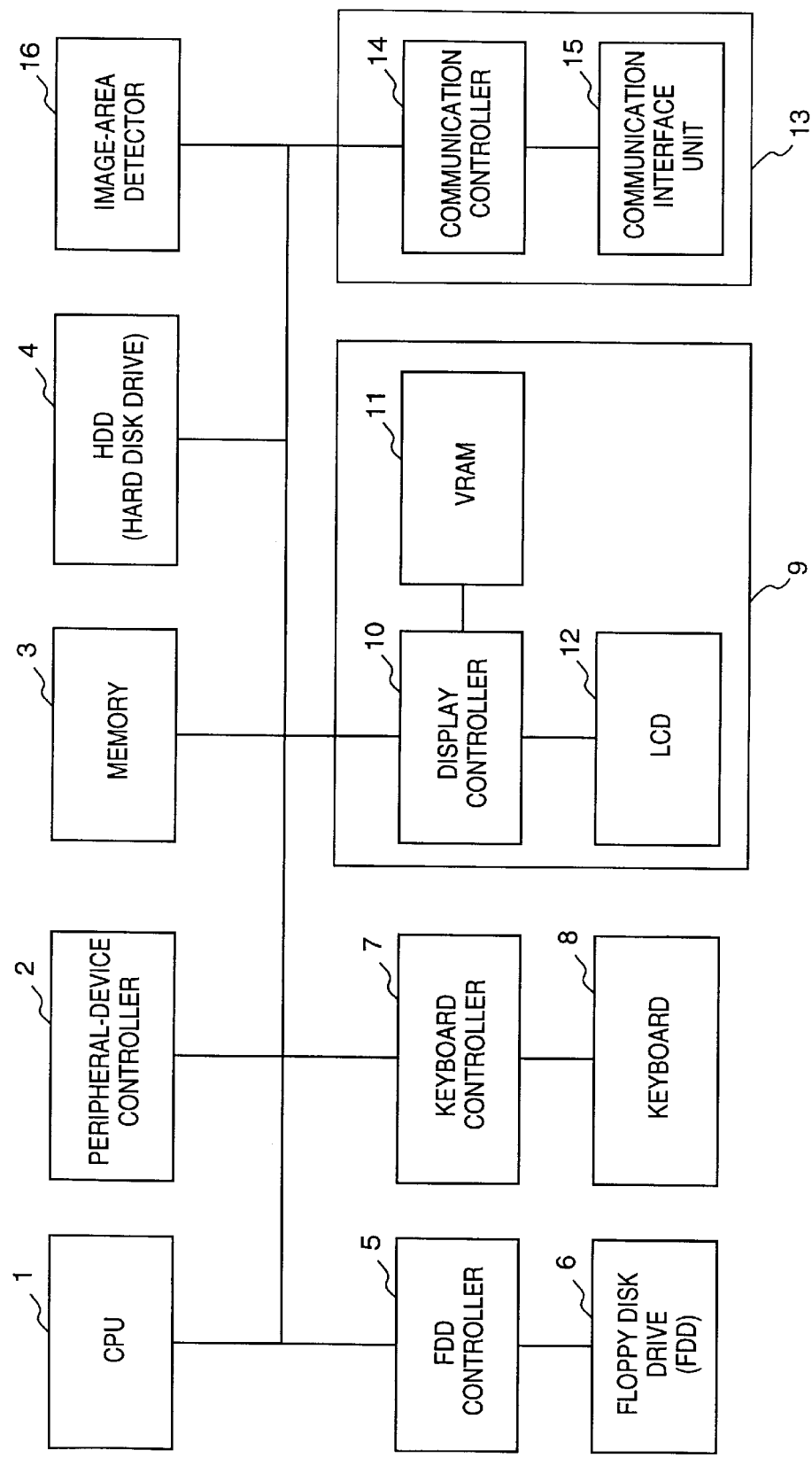
FIG. 2 is a block diagram schematically showing a construction of an image processing apparatus according to the first embodiment.

FIG. 2 is a block diagram schematically showing a construction of the image processing apparatus of the present embodiment. In FIG. 2, reference numeral 1 denotes a CPU for controlling the overall apparatus. The CPU 1 performs calculation in accordance with programs stored in a memory 3, and executes processing such as I/O control. Numeral 2 denotes a peripheral-device controller which is used with the CPU 1, for performing I/O controls (serial communication, parallel communication, realtime clock, timer, interruption, DMA etc.). Numeral 3 denotes a memory including a DRAM, a cache RAM, a ROM and the like as a main storage device of the CPU 1. Further, the memory 3 is used as a work area in image-area detection processing. Numeral 4 denotes a hard disk drive (HDD) for setting user data, apparatus settings, and storing image data. Numeral 5 denotes a floppy-disk drive (FDD) controller, and 6, a floppy-disk drive (FDD). Numeral 7 denotes a keyboard controller, and 8, a keyboard. In a display unit 9, numeral 10 denotes a display controller which sequentially reads display data from a VRAM 11, and transfers the data, while performing image-level conversion, to a liquid crystal display (LCD) panel 12. The display controller 10 performs accessing of the CPU 1 to the VRAM 11, and data transfer from the VRAM 11 to the display unit 2. In this embodiment, the LCD panel 12 displays various file information and image data. In a communication unit 13, numeral 15 denotes a communication interface unit, and 14, a communication controller. The communication interface unit 15 performs interface for serial-communication in accordance with standards such as of RS-232C, Ethernet and the like and parallel communication in accordance with standards such as centronics, SCSI and the like. The communication controller 14 controls input/output of various data such as text data and binary data such as image data. Also, the communication controller 14 has an interface unit for inputting television signals based on NTSC standards and the like. Numeral 16 denotes an image-area detector to be described in detail later, which extracts character area from image data.

Figure 1:
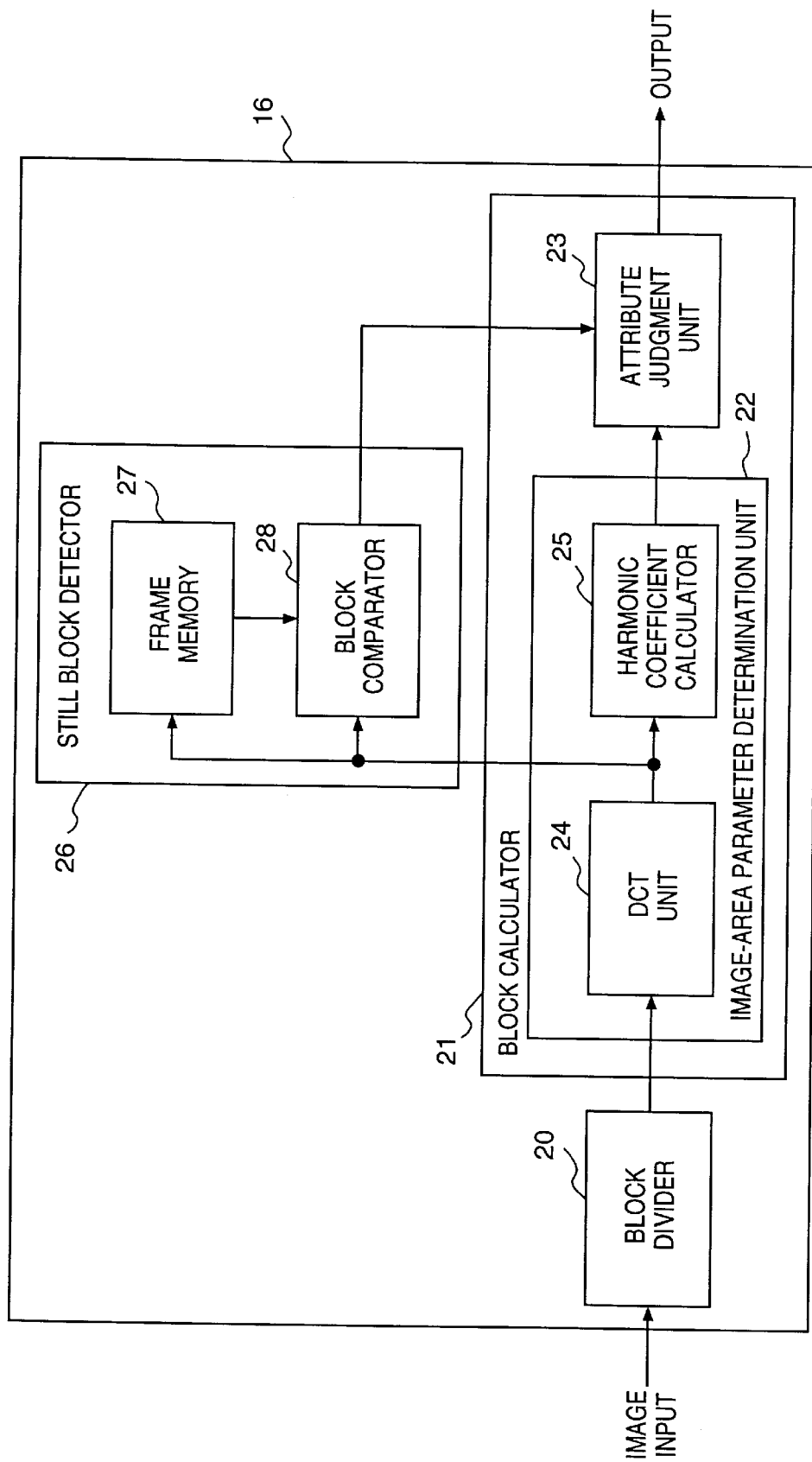
FIG. 1 is a block diagram showing a construction of an image-area detector according to a first embodiment.
Figure 3B:
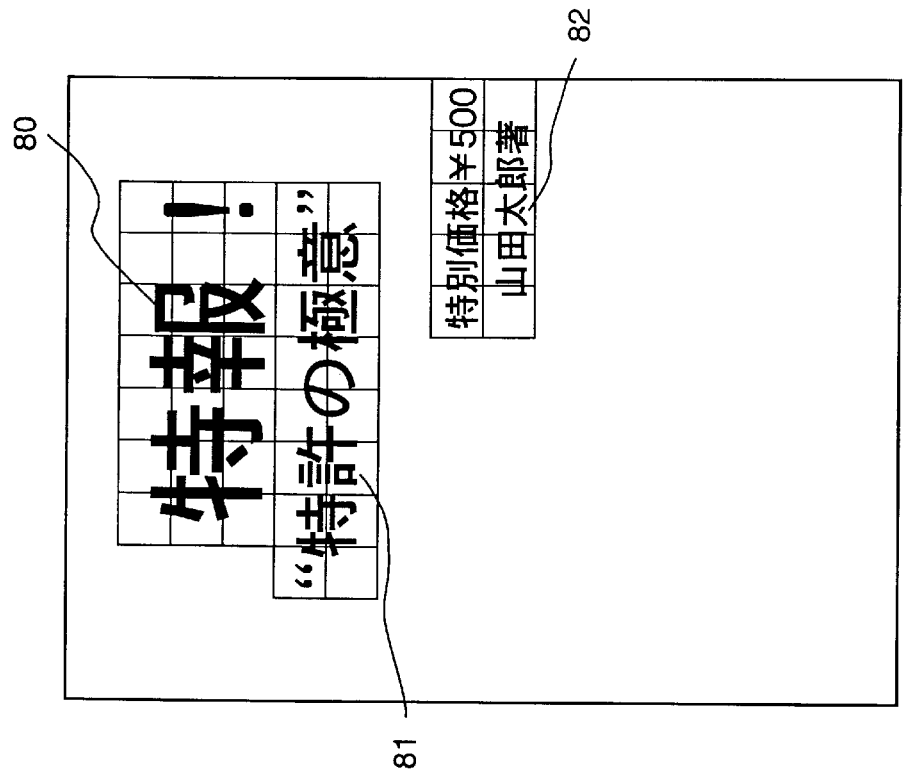
FIGS. 3A and 3B are examples respectively showing character-area extraction in the first embodiment.
Figure 3A:
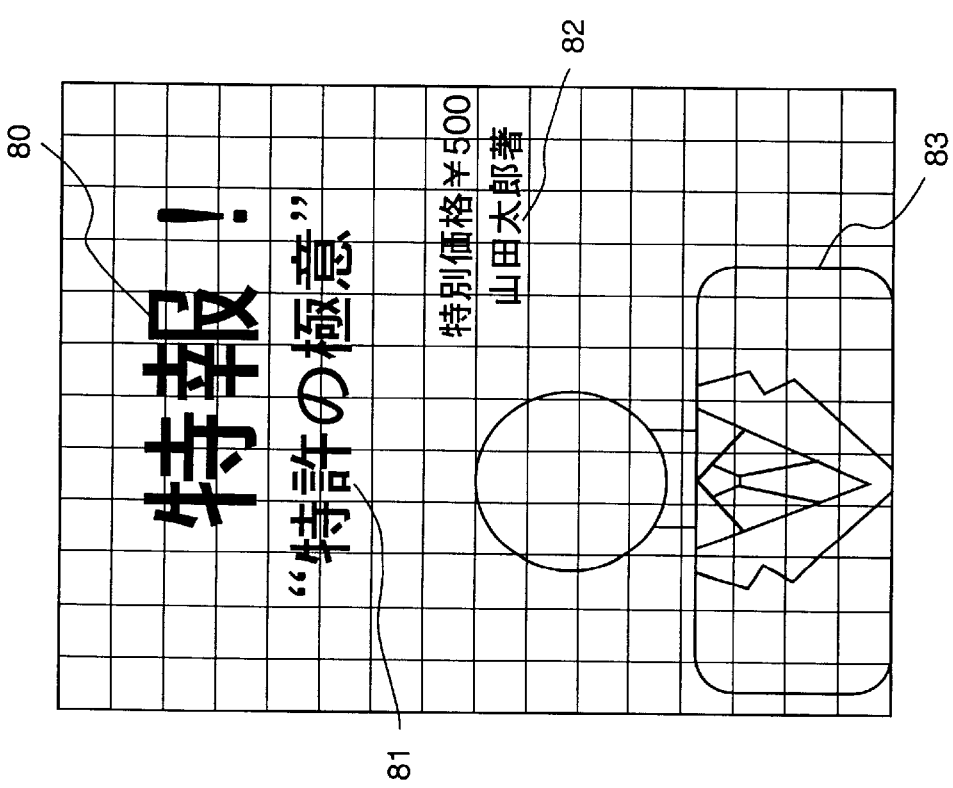

<Image-Area Detector (FIG. 1, FIGS. 3A and 3B>

Next, character-cutout according to the present embodiment will be described with reference to FIGS. 3A and 3B. In this embodiment, a color image is inputted via a video camera (not shown) or the communication unit 13, and character areas are extracted from the input color image. FIG. 3A shows an image example including captions 80, 81 and 82, and a picture image 83. In FIG. 3A, each cell represents a small block (to be described later) which is not actually displayed in the image. Note that in this embodiment, the size of one cell is 8×8 pixels. FIG. 3B shows the result of character extraction where only the character areas 80, 81 and 82 are extracted. This processing of the embodiment generates an image such as FIG. 3B from an input image such as FIG. 3A.

Next, the image-area detector 16 according to the present embodiment will be described with reference to the block diagram of FIG. 1.

In FIG. 1, numeral 20 denotes a block divider which divides image data into small 8×8 pixel blocks. Numeral 21 denotes a block calculator which judges whether each block is a character-area candidate or not, and stores the result of judgment into a candidate-storage area 26.

In the block calculator 21, numeral 22 denotes an image-area parameter determination unit as the image separation parameter determination unit in the prior art. The present embodiment differs from the prior art in that the block size is 8×8 pixels, and DCT is performed as orthogonal transformation. Numeral 24 denotes a DCT unit, and 25, a space harmonic coefficient calculator. Note that the block divider 20 and the DCT unit 24 are similar to those used in the general standards such as JPEG or MPEG standards, therefore the detailed explanation of these devices will be omitted.

The image-area parameter determination unit 22 calculates a feature parameter L for separating character area and halftone image area. However, image-area parameter division processing according to the present invention can use any other method so far as it detects a feature of character area. Numeral 23 denotes an attribute judgment unit which compares the result of calculation by the image-area parameter determination unit 22 with a threshold value to determine whether a block of interest belongs to a character area or not.

Numeral 26 denotes a still-block detector which compares time-sequentially adjacent frames to detect a block where the change of alternate coefficient values is small at a particular position. In the still-block detector 26, numeral 27 denotes a frame memory for storing alternate coefficients of a previous frame. Numeral 28 denotes a block comparator which compares the alternate coefficients of the previous frame with alternate coefficients of a current frame converted by the DCT unit 24.

<Processing Content>

Next, the content of processing in the image processing apparatus of this embodiment having the above construction will be described below.

The present embodiment detects caption characters combined in a moving image, especially caption characters overlaid on a plain background image.

First, candidate areas having a feature like a character image are detected from each frame of a moving image. At the same time, the frequency coefficients of the frame are compared with those in a previous frame, and areas having small change (small motion) are detected. Then candidate areas having small change amount are judged as character areas. This is made by utilizing display format of caption letters. The feature of caption letters is that they are displayed still at the same positions for several seconds for user to read. On the other hand, objects and the like displayed in the background of captions have motions by movement of themselves or camera work. The present embodiment prevents erroneous judgment on such objects in an image as character areas by adding a condition "whether a block of interest is a still block or not" to judgment conditions. Note that this determination whether or not a block is a still block will be referred to as "still-block judgment".

Returning to FIG. 1, the block divider 20 divides an input image into small blocks. The small block data is DCT converted in block units. Then the harmonic coefficient calculator 25 calculates a feature amount indicating a probability level of character area. On the other hand, the still-block detector 26 compares the DCT coefficients with the distribution of coefficients of the small block at a corresponding position in a previous frame. If the calculated feature amount of the current frame has a high probability level and has small change amount in comparison with alternate coefficients at a corresponding position in the previous frame, the attribute judgment unit 23 judges that the block of interest is a character, and outputs the judgment result. After this comparison processing, the alternate coefficients of the current frame are stored into the frame memory 27.

Next, the operation per each block will be described.

Figure 4:
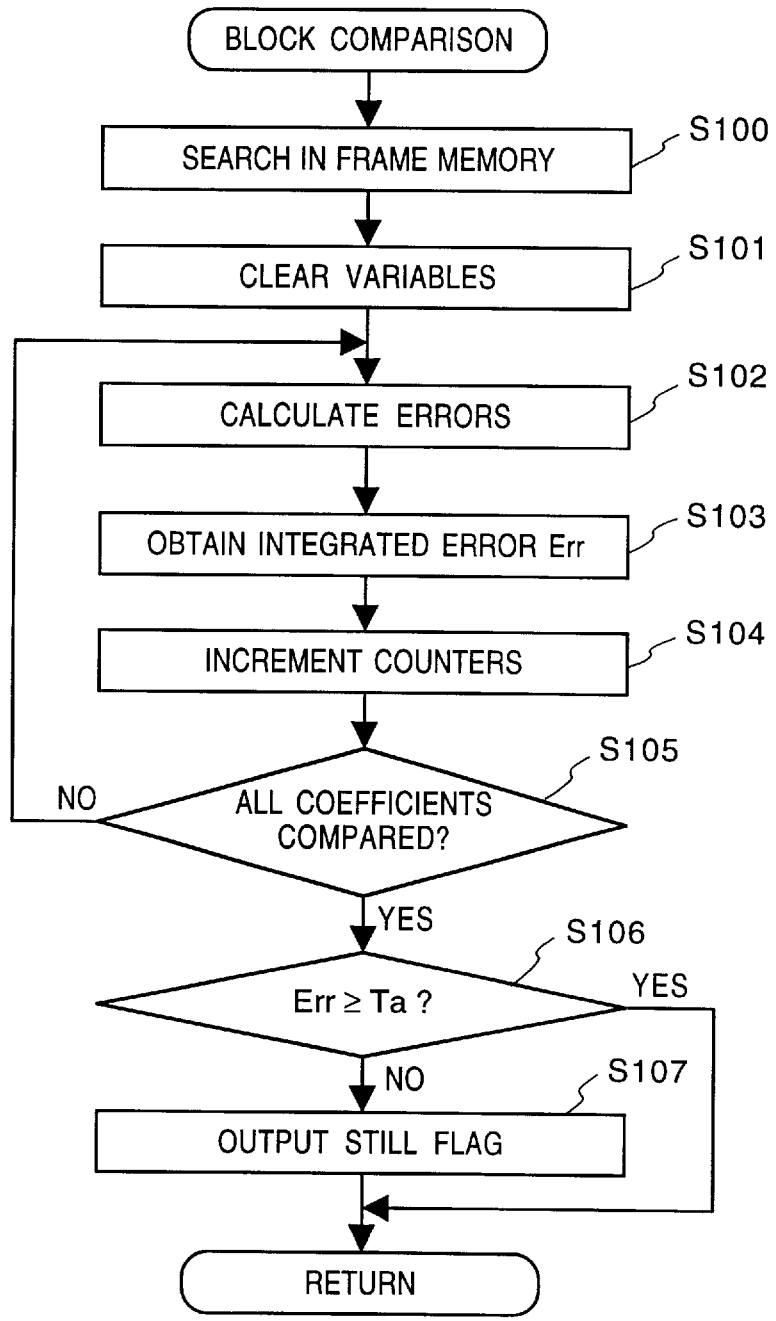
FIG. 4 is a flowchart showing processing by a still-block detector in FIG. 1.

FIG. 4 is a flowchart showing processing by the block comparator 28. The still-block detection will be described by using this figure. The block comparator 28 according to the present embodiment calculates errors between frequency coefficients of a block in a current frame and those of a corresponding block in a previous frame, and performs integration on the errors of all the frequencies. The block comparator 28 compares the integrated result with a threshold value, and if the result is equal to the threshold value or less, it judges that the image within the block is a still block.

In FIG. 4, at step S100, in the frame memory 27, the frequency coefficients of the block at a corresponding position in the previous frame are read. At step S101, variables of coefficient counters i, j and an integrated value register are cleared. At step S102, errors between the frequency coefficients of the block in the previous frame and those of the block of the current frame are calculated. Assuming that the, frequency coefficient of i-th row j-th column pixel of the block in the current frame is Aij, and that of a pixel of the corresponding block in the previous frames are Bij, error Eij is calculated by:

$$Eij = Aij - Bij \qquad (6)$$

At the following step S103, the error of coefficients of i-th row j-th column pixel of the block are integrated as follows:

$$Err = \Sigma |Eij| \qquad (7)$$

Note that this equation (7) can be represented as $$Err \leftarrow Err + |Eij|$$

The process proceeds to step S104, at which the values of the coefficient counters i and j are updated. At step S105, it is determined whether or not comparison of all the coefficients in the block has been completed. If NO, the process returns to step S102 to repeat the above processing.

If YES at step S105, it means that the integrated value of errors regarding all the coefficients within the block is stored as Err. Then at step S106, whether or not the integrated value Err is equal to a predetermined still-state determination threshold value Ta or greater is determined.

If Err<Ta holds, it is determined that there is almost no change between the block of interest and the corresponding block in the previous frame. The process proceeds to step S107, at which a "still flag" is outputted, and the process ends. Further, if it is determined that Err≧Ta holds, it means that there is change between the block of interest and the corresponding block in the previous frame. In this case, the "still flag" is not outputted.

Note that the processing at step S107 is to set an output signal from the attribute judgment unit 23 to, e.g., "1", and if the process skips this step S107, that means the process ends with the output signal "0". The threshold value Ta used for the judgment whether the block is still or not is set so as to absorb slight movement or change of a character area.

The above processing detects whether the object within the block is still or not. Further, the above example compares a block of interest with a corresponding block in a previous frame, however, the example may be arranged to use a plurality of past frames. Also, it may be arranged to store frequency coefficients in a plurality of frames and compare the coefficients in units of sequential frames. Further, as a method for judgment of still block, the present embodiment performs integration on errors of the respective coefficients, however, any other method can be used for the judgment. For example, after all the coefficients within a block of interest in a current frame and a corresponding block in a previous frame have been integrated, the error between the integrated results can be taken; otherwise, judgment by pattern matching can be employed since it does not differ from the subject matter of the present invention. Note that the above processing is described as realized by software, however, it can be realized by logic circuits.

Figure 5:
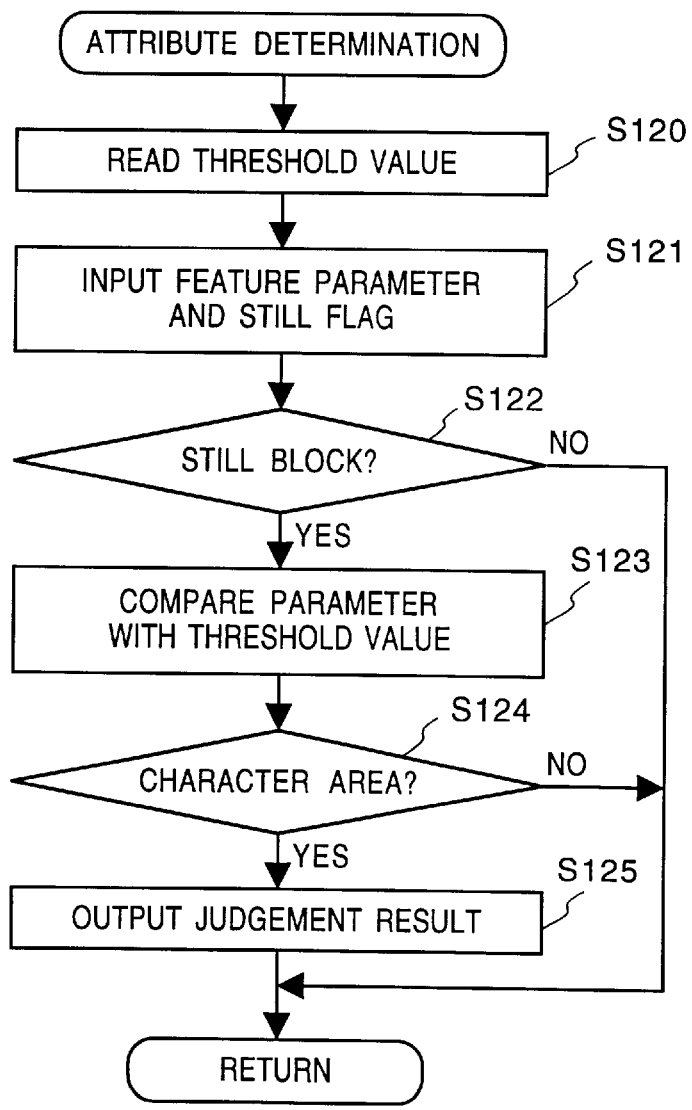
FIG. 5 is a flowchart showing processing by an attribute judgment unit 23 in FIG. 1.

Next, the content of processing by the attribute judgment unit 23 according to the present embodiment will be described in line with the flowchart of FIG. 5.

The attribute judgment unit 23 of the present embodiment judges whether or not a block of interest is a character area, based on the feature parameter outputted by the image-area parameter determination unit 22 and the still flag outputted by the still-block detector 26. More specifically, the processing by the attribute judgment unit 23 is as follows.

At step S120, a character judgment threshold value Tb is read from the memory 3. At step S121, the feature parameter L is inputted from the image-area parameter determination unit 22, and the still flag is inputted from the still-block detector 26. At step S122, it is determined whether or not the block of interest is a still block, based on the input still flag. If NO, it is determined that the block of interest is not a character area, and the process ends.

On the other hand, if it is determined at step S122 that the block of interest is still, the process proceeds to step S123, at which the input feature parameter L is compared with the previously-read threshold value Tb. At step S124, the process divides based on the result of comparison at step S124. That is, if it is determined that the feature parameter L is equal to the threshold value Tb or greater, the process proceeds to step S125, at which it is determined that the block of interest is a character area, and the result of determination is outputted in the form of output signal. If it is determined that the feature parameter L is less than the threshold value Tb, it is determined that the block of interest is not a character area, then the process ends.

Note that it may be simply arranged to output the result of judgment by each block as signals of different logic levels, otherwise, to output the image of a block judged as a character area into a file.

The above processing detects only a block which is a still block and has the feature parameter L, equal to the character judgment threshold value Tb or greater, as a character area.

As described above, the present embodiment judges image areas by comparing the distribution of coefficients between frames, thus enables stable area extraction without variation in frames. Accordingly, in a TV program, for example, caption areas can be easily extracted; further, other areas beside the caption areas can also be extracted.

Note that the present invention can be widely used for various purposes as well as applied to the above embodiment. For example, the present embodiment uses DCT as an orthogonal conversion, however, the conversion may be replaced with Fourier transformation or Hadamard transformation. Further, as the image-area parameter division, the present embodiment calculates the value of the parameter L and compares the parameter L with the threshold value, however, any other method can be used for detecting the feature of character area. This embodiment eliminates blocks having parameters equal to the threshold value or greater by still-block judgment by the attribute judgment unit 23, further, the threshold value may be corrected by still-block judgment. This detects still caption areas more easily, and detects nearly still character areas in images.

The above processing is described as performed by attaching the image-area detector 16 to an extended slot provided at the information processing apparatus such as a personal computer. However, the processing can be performed by any other device so far as the CPU 1 of the information processing apparatus can fully perform high-speed calculation.

In such cases, a corresponding program is loaded from the HDD 4 or the FDD 6 into the RAM of the memory 3, and the CPU 1 executes the loaded program. Note that a moving-image is inputted via the communication interface unit 15, however, it may be received via any other interface.

<Second Embodiment>

The first embodiment performs image-area judgment by comparing all the coefficients within a block with a threshold value, since the judgment is directed to an image where caption letters are overlaid on a plain background image. However, in a case where caption letters are overlaid on a background which is changing, the distribution of coefficients within a small block changes by frame, thus the character areas cannot be detected. A second embodiment of the present invention deals with this problem, to eliminate the influence of a background and further increase the area extraction rate. In the following description, the second embodiment extracts only coefficients of a particular portion within the small block for comparison and judgment.

<Image-Area Detector (FIG. 6)>

Figure 6:
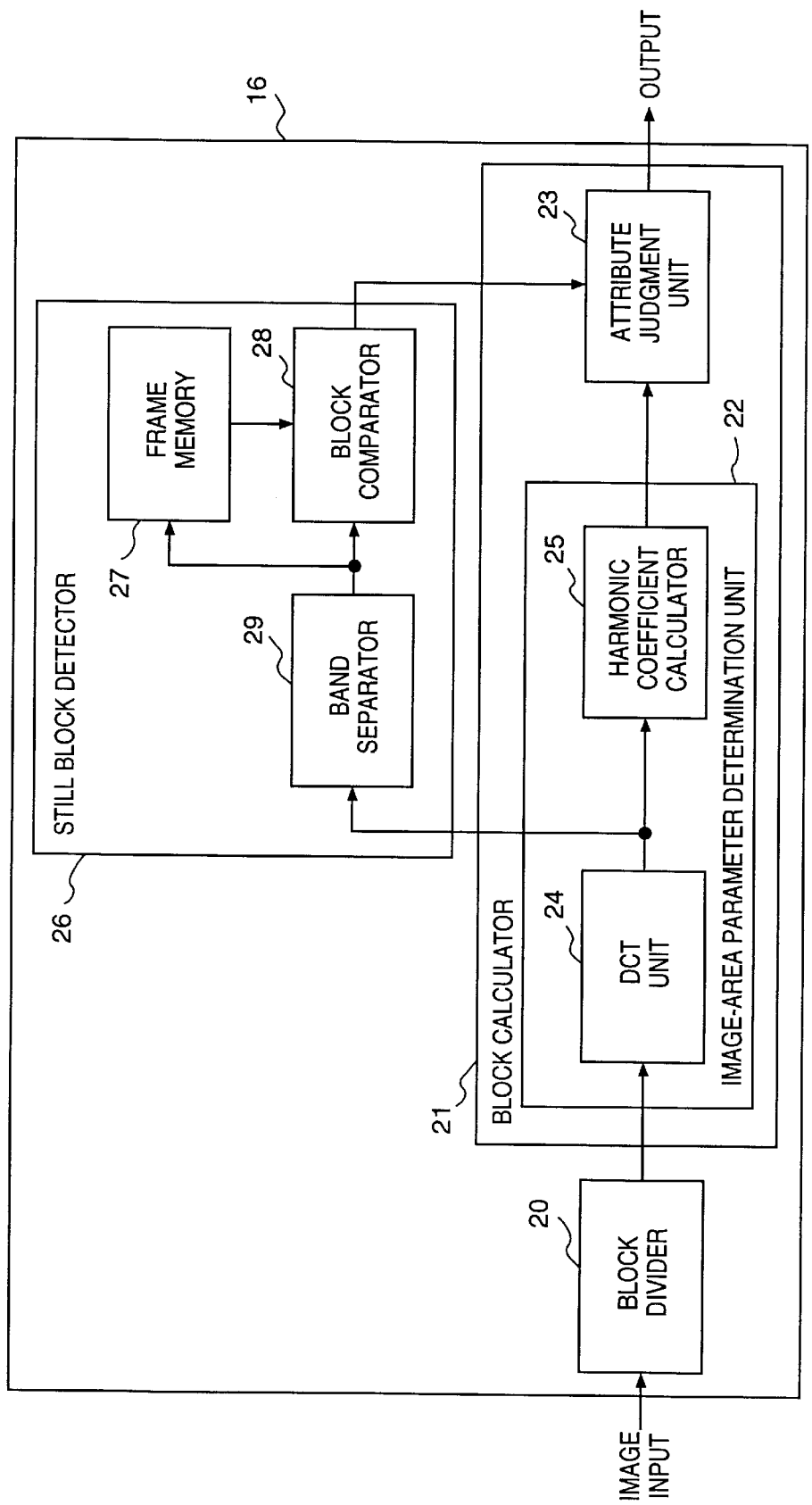
FIG. 6 is a block diagram showing a construction of the image-area detector according to a second embodiment.
Figure 10C:
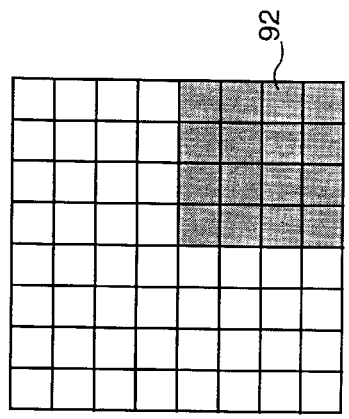
FIGS. 10A to 10F are explanatory views respectively showing a coefficient-integrated area in the conventional art.
Figure 10B:
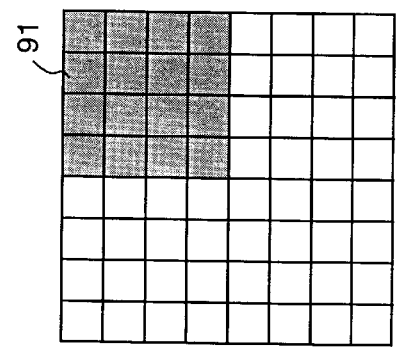
Figure 10A:
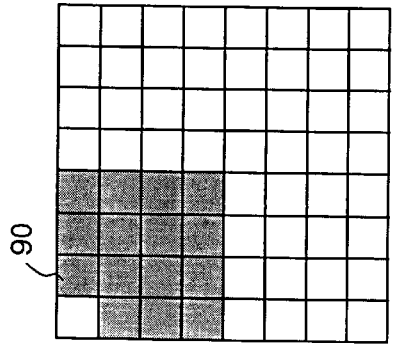
Figure 10F:
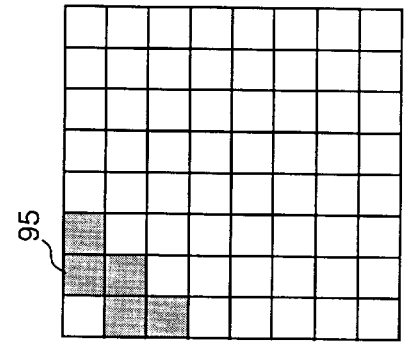
Figure 10E:
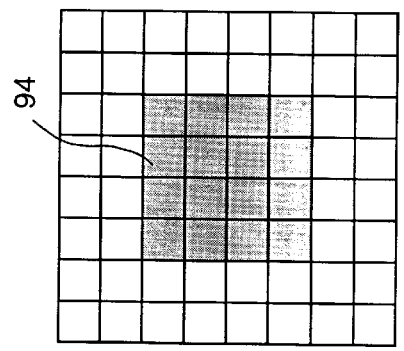
Figure 10D:
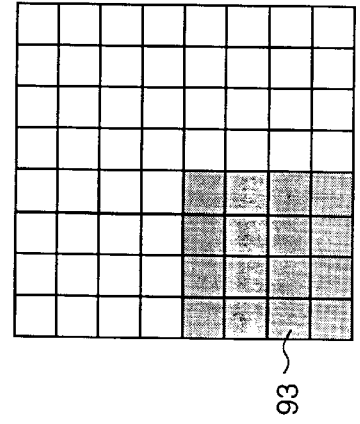

First, a construction of the image-area detector 16 according to the second embodiment will be described by using the block diagram of FIG. 6. Note that the other elements correspond to those in FIG. 1 of the first embodiment and therefore the explanations of those elements will be omitted. In FIG. 6, the construction differs from the first embodiment in that the still-block detector 26 further includes a band separator 29. The band separator 29 takes out only coefficients of a pre-set portion from DCT coefficients, stores the taken coefficients into the frame memory 27, and at the same time, inputs them into the block comparator 28 as coefficient data.

<Band separator (FIGS. 7 and 8>

Next, the operation of the band separator 29 will be described below.

FIG. 7 shows band separation within a block. In FIG. 7, the small 8×8 size block is divided into two parts by a diagonal line. The block has a low-frequency area 70 and a high-frequency area 71 after DCT conversion.

Next, FIG. 8 shows the distribution of coefficients in the respective frequency areas based on image types. In FIG. 8, numeral 80 denotes the type of an image included in the small block; 81, the ratio of amplitude of coefficients in the low-frequency area; and 82, the ratio of amplitude of coefficients in the high-frequency area. The ratios 81 and 82 are obtained by integration of the absolute value of the coefficients within the respective areas, as the ratios with respect to the whole block. Accordingly, the sums of these ratios except round off error are "100".

Numeral 83 denotes a character (caption letter) image block; 84, a halftone image block; and 85, [average coefficient distribution of] an image block including character image(s) and halftone image(s). In the image type 83 (character), the low-frequency area and the high-frequency area are half-and-half included. In the image type 84 (halftone), the low-frequency area occupies the most part of the image. In the image type 85, both areas are included more even, however, the low-frequency area is larger than the high-frequency area.

The purpose of the second embodiment is to detect caption letters overlaid on a plain or moving background. The characters over a plain background correspond to the image type 83, and the characters over a moving background, to the image type 85. Accordingly, the present embodiment is only required to detect blocks of the image types 83 and 85. The still-block detector 26 detects that a portion having the feature of character within these blocks is still.

Regarding this point, the low-frequency area ratio 81 is commonly high in the image types 83 to 85. On the other hand, the high-frequency area ratio 82 is high in the image types 83 and 85 including characters, however, it is very low in the image type 84 including only a halftone image. Accordingly, the band separator 29 takes out alternate coefficients in the high-frequency area 71 and uses them for judging movement of the block. Assuming that the alternate coefficient of i-th row j-th column pixel of block in the current frame is Aij, the band separator 29 takes out only the alternate coefficients corresponding to the following equation (8) and outputs it into the frame memory 27 and the block comparator 28.

$$Aij \ (i+j:7\sim16) \qquad (8)$$

The processing by the block comparator 28 that inputs the coefficients is the same as that in the first embodiment, therefore the explanation of the processing will be omitted.

The above processing eliminates the motion of a halftone background, and detects still portion having the feature of character area.

As described above, the second embodiment eliminates background motion and enables stable area extraction by comparing coefficients in particular portions between frames.

Note that the present invention is not limited to the above embodiment and can be used in various applications. The method for frequency-band separation by the band separator may be arbitrarily selected. For example, the number of separated band areas may be three. Further, the separated area shape can be arbitrary. In the second embodiment, only the coefficients in a particular band area are used for still-block judgment, however, each band area may be weighted for the judgment. Further, as a judgment condition for the attribute judgment unit, the result of judgment of an adjacent block may be employed to further increase the extraction rate.

<Third Embodiment>

The above first and second embodiments are realized by attaching the image-area detector 16 which is an expansion board or expansion card to the expansion slot of an image processing apparatus such as a personal computer or the like.

However, if the apparatus has interface for inputting moving images and the CPU 1 has a required processing speed, the present invention is realized by software.

Figure 11:
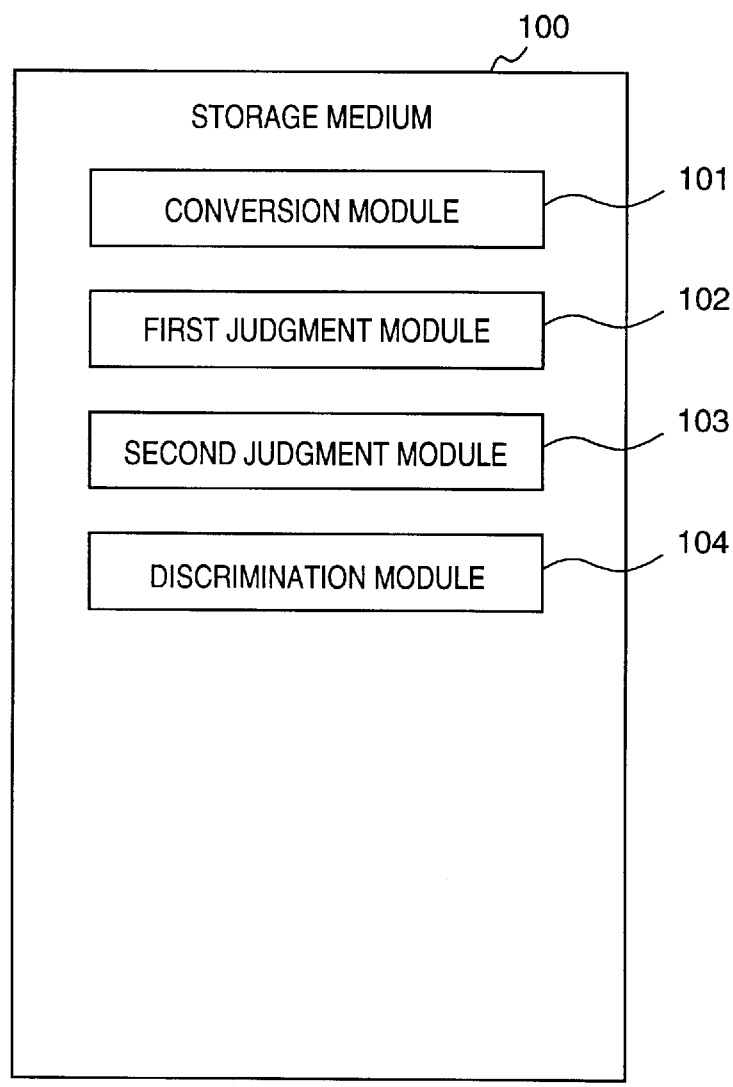
FIG. 11 is an explanatory view showing the contents of a storage medium holding a program according to a third embodiment.

For example, the present invention can be realized by storing program modules as shown in FIG. 11 into a storage medium such as a floppy disk attached to the FDD 6 or a disk in the HDD 4 in FIG. 2, and loading the stored program modules into the RAM of the memory 3.

In FIG. 11, numeral 100 denotes a storage medium; 101, an orthogonal conversion module; 102; a first judgment module for judging whether or not a block of interest has a high probability that the block is a character area, based on data obtained from orthogonal conversion; 103, a second judgment module for comparing a converted block in a previous frame and a converted block in a current frame, and judging whether change amount is large or small; 104, a discrimination module for discriminating whether or not the block of interest is a character area based on the results of judgment at the first and second judgment modules, and returning the result of judgment to an upper processing.

The present invention can be applied to a system constituted by a plurality of devices or to an apparatus comprising a single device. Furthermore, the invention is also applicable to a case where the invention is embodied by supplying a program to a system or apparatus. In this case, a storage medium, storing a program according to the invention, constitutes the invention. The system or apparatus installed with the program read from the medium realizes the functions according to the invention.

As described above, the present invention eliminates influence of motion of background and enables stable image extraction, especially character-area cutout at a high extraction rate.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus which transforms image data into data on axes in frequency space, and judges the type of image areas based on features of the data on the axes in space frequency, comprising:

input means for inputting sequentially frame images;

transformation means for orthogonally transforming input frame image data by blocks of a predetermined size;

first judgment means for judging an attribute of a block of interest in a current frame, based on the result of orthogonal transformation by said transformation means;

second judgment means for judging the attribute of the block of interest in the current frame, based on the difference between the result of orthogonal transformation on the current frame and the result of orthogonal transformation on at least one previous frame inputted prior to the current frame; and discrimination means for discriminating the attribute of the block of interest in the current frame, based on the judgments by said first and second judgment means.

2. The image processing apparatus according to claim 1, wherein said transformation means performs discrete cosine transformation.

3. The image processing apparatus according to claim 1, wherein said transformation means performs Hadamard transformation.

4. The image processing apparatus according to claim 1, wherein said transformation means performs Fourier transformation.

5. The image processing apparatus according to claim 1, wherein said first judgment means includes:

calculation means for calculating a sum of coefficients within a block after orthogonal transformation; and comparison means for comparing the sum with a predetermined threshold value.

6. The image processing apparatus according to claim 1, further comprising extraction means for extracting a feature amount in a predetermined band, based on data obtained after the orthogonal transformation by said transformation means on the block of interest, wherein said discrimination means discriminates the attribute of the block of interest, based on the result of extraction by said extraction means in addition to the results of judgment by said first and second judgment means.

7. The image processing apparatus according to claim 6, wherein said extraction means extracts a feature amount in a high-frequency area.

8. The image processing apparatus according to claim 1, wherein if the attribute of the block of interest discriminated by said discrimination means is a predetermined attribute, the result of discrimination is outputted as an output signal.

9. The image processing apparatus according to claim 8, wherein the attribute of the block of interest corresponds to a character.

10. The image processing apparatus which sequentially inputs frame images, transforms input image data into data on axes in frequency space, and judges the type of image areas based on features of the data on the axes in space frequency, comprising:

transformation means for orthogonally transforming input frame image data by blocks of a predetermined size;

first judgment means for judging an attribute of a block of interest in a current frame, based on the result of orthogonal transformation by said transformation means;

second judgment means for judging the attribute of the block of interest in the current frame, based on the result of orthogonal transformation on at least one previous frame inputted prior to the current frame; and discrimination means for discriminating the attribute of the block of interest in the current frame, based on the results of judgment by said first and second judgment means, wherein said second judgment means includes:

second calculation means for calculating at least a sum of differences between respective coefficients within the block of interest, after orthogonal transformation, in the current frame, and respective coefficients within a block, corresponding to the block of interest, after orthogonal transformation, in the previous frame; and comparison means for comparing the calculated sum with a predetermined threshold value.

11. An image processing method transforms image data into data on axes in frequency space, and judges the type of image areas based on features of the data on the axes in space frequency, comprising:

an inputting step of inputting sequentially frame images;

a transformation step of orthogonally transforming input frame image data by blocks of a predetermined size;

a first judgment step of judging an attribute of a block of interest in a current frame, based on the result of orthogonal transformation at said transformation step;

a second judgment step of judging the attribute of the block of interest in the current frame, based on the difference between the result of orthogonal transformation on the current frame and result of orthogonal transformation on at least one previous frame inputted prior to the current frame; and a discrimination step of discriminating the attribute of the block of interest in the current frame, based on the judgments at said first and second judgment steps.

12. The image processing method according to claim 11, wherein at said transformation step, discrete cosine transformation is performed.

13. The image processing method according to claim 11, wherein at said transformation step, Hadamard transformation is performed.

14. The image processing method according to claim 11, wherein at said transformation step, Fourier transformation is performed.

15. The image processing method according to claim 11, wherein at said first judgment step includes:

a calculation step of calculating a sum of coefficients within a block after orthogonal transformation; and a comparison step of comparing the sum with a predetermined threshold value.

16. The image processing method according to claim 11, further comprising an extraction step of extracting a feature amount in a predetermined band, based on data obtained after the orthogonal transformation at said transformation step on the block of interest, wherein at said discrimination step, the attribute of the block of interest is discriminated, based on the result of extraction at said extraction step in addition to the results of judgment at said first and second judgment steps.

17. The image processing method according to claim 16, wherein at said extraction step, a feature amount in a high-frequency area is extracted.

18. The image processing method according to claim 11, wherein if the attribute of the block of interest discriminated at said discrimination step is a predetermined attribute, the result of discrimination is outputted as an output signal.

19. The image processing apparatus according to claim 18, wherein the attribute of the block of interest corresponds to a character.

20. The image processing method which sequentially inputs frame images, transforms input image data into data on axes in frequency space, and judges the type of image areas based on features of the data on the axes in space frequency, comprising:

a transformation step of orthogonally transforming input frame image data by blocks of a predetermined size;

a first judgment step of judging an attribute of a block of interest in a current frame, based on the result of orthogonal transformation at said transformation step;

a second judgment step of judging the attribute of the block of interest in the current frame, based on the result of orthogonal transformation on at least one previous frame inputted prior to the current frame; and a discrimination step of discriminating the attribute of the block of interest in the current frame, based on the results of judgment at said first and second judgment steps, wherein said second judgment step includes:

a second calculation step of calculating at least a sum of differences between respective coefficients within the block of interest, after orthogonal transformation, in the current frame, and respective coefficients within a block, corresponding to the block of interest, after orthogonal transformation, in the previous frame; and a comparison step of comparing the calculated sum with a predetermined threshold value.

21. An image processing apparatus which transforms image data into data on axes in frequency space and judging the type of image areas based on features of the data on the axes in frequency space, by reading a predetermined program from a storage medium, said storage medium including:

input process codes for inputting sequentially frame images;

transformation process codes for orthogonally transforming input frame image data by blocks of a predetermined size;

first judgment process codes for judging an attribute of a block of interest in a current frame, based on the result of orthogonal transformation at transformation process;

second judgment process codes for judging the attribute of the block of interest in the current frame, based on the difference between the result of orthogonal transformation on the current frame and the result of orthogonal transformation on at least one previous frame inputted prior to the current frame; and discrimination process codes for discriminating the attribute of the block of interest in the current frame, based on the judgments by processing of said first and second judgment process codes.

22. The image processing apparatus according to claim 21, wherein said storage medium is detachable to said image processing apparatus.

* * * * *

UNITED STATES PATENT AND TRADEMARK OFFICE
CERTIFICATE OF CORRECTION

PATENT NO. : 5,828,782

DATED : October 27, 1998

INVENTOR(S): SHINICHI SUNAKAWA ET AL.

It is certified that error appears in the above-identified patent and that said Letters Patent is hereby corrected as shown below:

COLUMN 2

Line 23, "a" should read --an--;
Line 47, "has" should read --has as--.

COLUMN 4

Line 56, "3B>" should read --3B)>--.

COLUMN 5

Line 57, "user" should read --the user--;
Line 63, "still block" should read --still-block--.

COLUMN 6

Line 32, "that the," should read --that the--.

COLUMN 7

Line 12, "still block," should read --still-block,--;
Line 62, "enables" should read --enabling--.

COLUMN 8

Line 53, "8>" should read --8)>--.

UNITED STATES PATENT AND TRADEMARK OFFICE
CERTIFICATE OF CORRECTION

PATENT NO. : 5,828,782

DATED      : October 27, 1998

INVENTOR(S): SHINICHI SUNAKAWA ET AL.

It is certified that error appears in the above-identified patent and that said Letters Patent is hereby corrected as shown below:

COLUMN 9

Line 2, "round off" should read --round-off--;
Line 4, "[average" should read --average--;
Line 5, "of]" should read --of--.

COLUMN 12

Line 16, "at" should be deleted.

Signed and Sealed this

Third Day of August, 1999

Attest:

Q. TODD DICKINSON

Attesting Officer

Acting Commissioner of Patents and Trademarks